United States Patent [19]

Schievelbein et al.

[11] 4,438,002

[45] Mar. 20, 1984

[54] SURFACTANT FLOODING SOLUTION

[75] Inventors: Vernon H. Schievelbein, Houston; Paul Zabczuk, Dallas, both of Tex.

[73] Assignee: Texaco Inc., White Plains, N.Y.

[21] Appl. No.: 420,430

[22] Filed: Sep. 20, 1982

[51] Int. Cl.³ .................. C07C 143/00; B01F 3/00; E21B 3/00; E21B 43/16

[52] U.S. Cl. .................. 252/8.55 D; 252/8.5 E; 252/363.5; 260/503; 260/503.5; 260/505 C; 106/14.13; 166/273; 166/274; 166/275

[58] Field of Search .................. 252/8.55 D, 8.55 E, 252/363.5, 392, 395; 166/274, 275, 273; 106/14.13, 14.18, 14.42; 260/503, 503.5, 505 C; 422/12

[56] References Cited

U.S. PATENT DOCUMENTS

| | | | |
|---|---|---|---|
| 3,302,713 | 2/1967 | Ahearn et al. | 166/9 |
| 3,348,611 | 10/1967 | Reisberg | 166/9 |
| 3,366,174 | 1/1968 | Ferrell et al. | 166/9 |
| 3,508,612 | 4/1970 | Reisberg et al. | 166/274 |
| 3,811,504 | 5/1974 | Flournoy et al. | 166/273 |
| 3,811,505 | 5/1974 | Flournoy et al. | 166/274 |
| 3,890,239 | 6/1975 | Dycus et al. | 252/8.55 D |

*Primary Examiner*—Richard D. Lovering
*Assistant Examiner*—Catherine S. Kilby
*Attorney, Agent, or Firm*—Robert A. Kulason; Jack H. Park; Harold J. Delhommer

[57] ABSTRACT

An aqueous treating solution is disclosed for surfactant flooding operations to increase oil recovery. The treating solution comprises water, one or more surfactants, one or more solubilizers and a sulfonated dicyclopentadiene compound which permits a reduction in the needed quantities of surfactant and solubilizer without loss of surfactant stability and activity or oil recovery efficiency.

8 Claims, 2 Drawing Figures

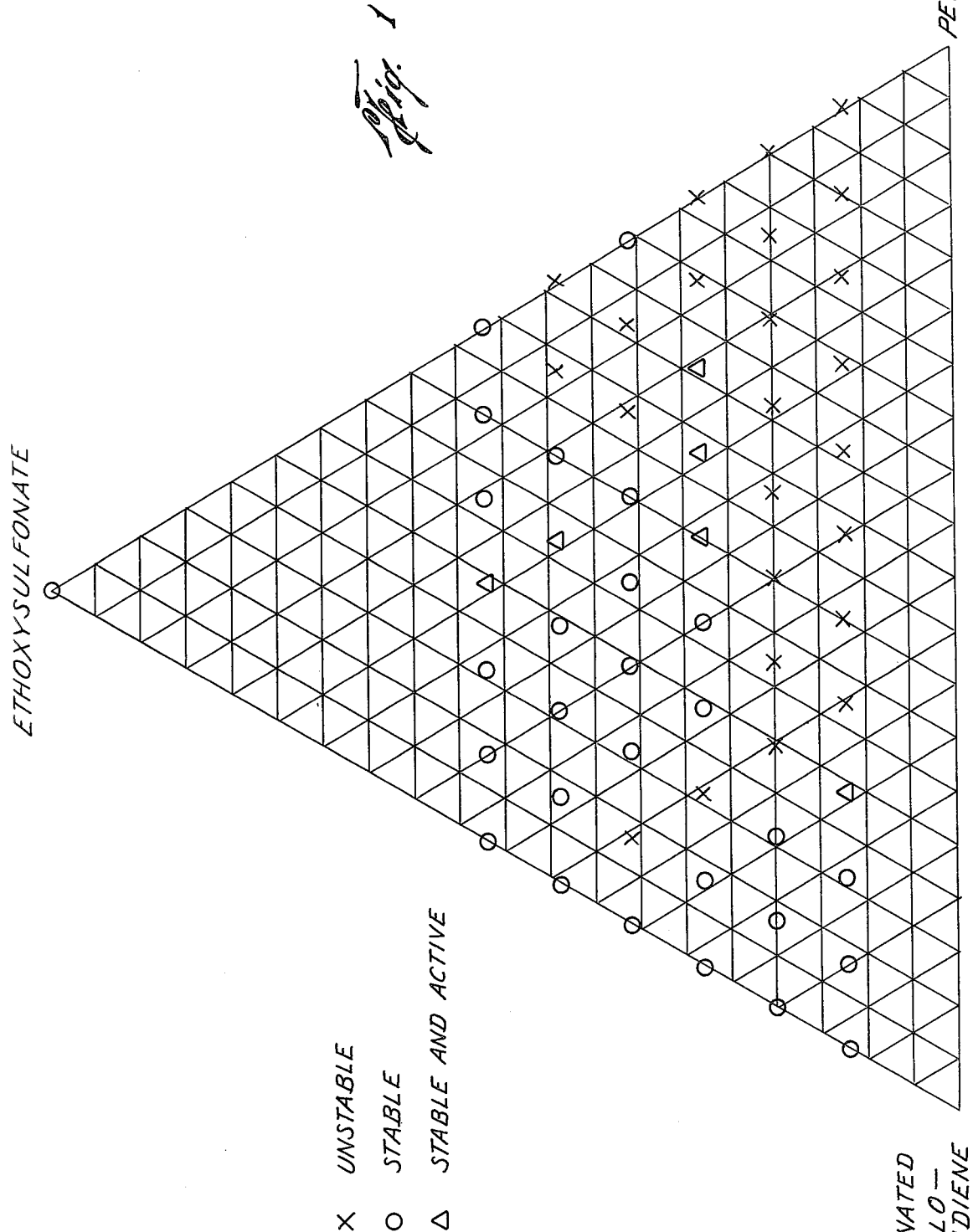

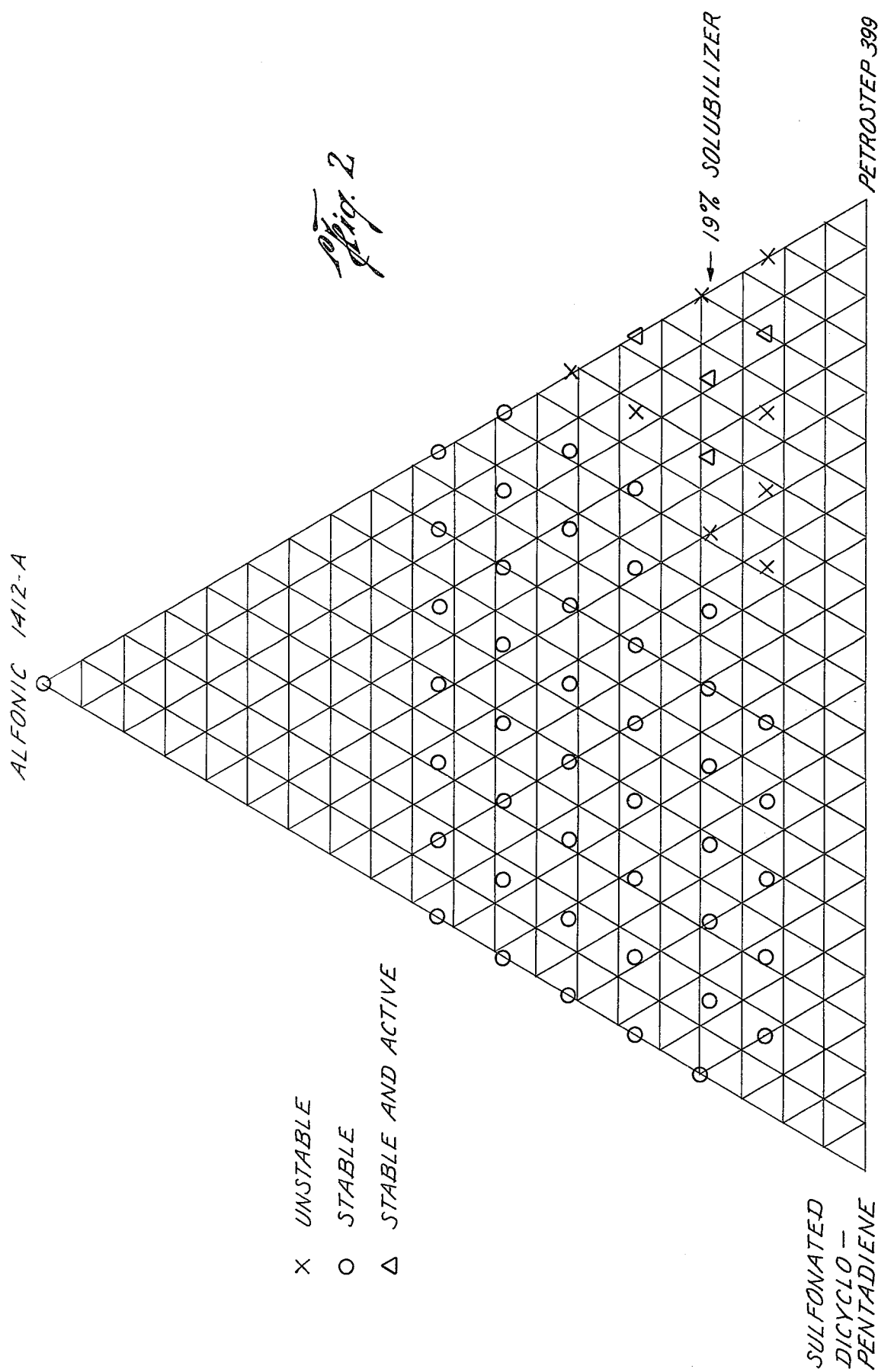

SURFACTANT FLOODING SOLUTION

BACKGROUND OF THE INVENTION

This invention relates to the recovery of oil from subterranean formations by water flood operations and more particularly relates to the use of chemical additives in surfactant flooding operations.

Petroleum fluids are usually recovered from a subterranean formation or reservoir by employing the natural energy of the reservoir to push the petroleum fluids from the reservoir into wellbores. The technique is referred to as primary recovery. However, 65% to 90% or more of the original oil is usually left in the reservoir at the conclusion of the primary recovery program. When the natural reservoir energy is unable to produce petroleum fluids at an economically determined rate, it is conventional to employ enhanced oil recovery techniques in order to recover more of the petroleum fluids remaining in the reservoir.

One such enhanced oil recovery technique employed is a water flood operation. A water flood operation uses injection wells drilled into the reservoir to inject flood water into the reservoir. The flood water increases the pressure in the reservoir and initially provides additional energy to push oil into production wellbores for recovery. The flood water replaces the oil that is initially produced and forms a wave front traveling through the reservoir towards the production wellbores. The water wave front displaces at least some of the oil in the reservoir and drives or carries this oil through the formation into production wellbores for recovery. Water flood operations can achieve advantageous recovery of oil when subsurface geological conditions are favorable.

However, even when geological conditions favor a water flood operation, oil recovery may be limited due to the relatively poor ability of the flood water to displace oil remaining in the reservoir's pore structure. This is due to several factors including the pore size of the reservoir, its structure, and oil viscosity. The pore size and structure of the reservoir along with the oil resisting dispersion in the water may make the pore structure impermeable to the oil, while the pore structure is permeable to the flood water. So the flood water, having less flow resistance than the oil, may form channels or fingers, bypassing the oil in the formation. For this reason, a large portion of the oil usually remains in the reservoir after a water flood operation.

Investigations of ways to increase oil recovery by improving the displacement ability of a water flood have produced useful surfactants which reduce the interfacial surface tension between the oil and water in the reservoir. With lower interfacial surface tension, oil that was trapped in the pore structure can disperse into the water as smaller and more easily deformable droplets. Many types of surfactants have been investigated and the choice of which surfactant to employ in a water flood operation is dependent upon the conditions in the reservoir, as well as the cost and availability of the surfactants.

U.S. Pat. No. 3,302,713 to Ahearn et al. discloses the use of petroleum sulfonates as a surfactant to be employed in a water flood operation and specifies the boiling range fraction of petroleum crude to be sulfonated. U.S. Pat. No. 3,348,611 to Reisberg discloses a composition of high and low molecular weight alkylaryl sulfonate surfactants for use in water flood operations. U.S. Pat. No. 3,366,174 to Ferrell et al. discloses a water flood surfactant composition of a low to medium weight petroleum sulfonate and an oil soluble organic polar material.

U.S. Pat. No. 3,508,612 to Reisberg et al. discloses a water flood surfactant composition of an organic sulfonate and a sulfated oxyalkylated alcohol. Various other mixtures of anionic and nonionic surfactants are sometimes employed in water flood operations. U.S. Pat. Nos. 3,811,504; 3,811,505; 3,890,239, are representative of such mixtures of anionic and nonionic surfactants used in water flood operations.

Most water flood operations have employed a petroleum sulfonate as a sole surfactant, or at least a major component of a mixture of surfactants. Synthetic alkylaryl sulfonates and alkyl sulfonates and sulfates have been proposed as oil recovery surfactants. Sulfonates are preferred because they have a better high temperature stability than the sulfates. These surfactants are all classified as organic sulfonates and are usually metal salts of alkylbenzene sulfonate containing 12 to 30 carbon atoms, but may also be aliphatic sulfonates or alkylated naphthalene sulfonates. These surfactants have an equivalent molecular weight that ranges from 320 to 700. Equivalent molecular weight, as used herein, is a compound's molecular weight divided by the number of sulfonates in that compound.

Field water flood operations employing an organic sulfonate surfactant have not always been totally satisfactory due to the fact that surfactants sometimes separate from the water and form a non-miscible layer on top of the water. This layer does not move in conjunction with the water wave front, resulting in loss of oil recovery activity and a quantity of surfactant. Further, when organic sulfonates contact divalent metal ions, which are almost always present in underground hydrocarbon formation, the organic sulfonates tend to precipitate out of the water flood and plug the reservoir pores.

To combat layering and precipitation problems, a material with both water soluble and oil soluble characteristics is usually added to organic sulfonate surfactant mixtures. When used in water flooding, these materials are generally referred to as "solubilizers" and constitute the most expensive component in a surfactant mixture. Conventional solubilizers are sulfate or sulfonate salts of polyethoxylated alcohols or alkyl phenols. The amount of solubilizer required depends on the amount of and types of organic sulfonate surfactants employed in the water flood operation. A minimum amount of solubilizer is required to prevent the surfactants from layering out of the flood water. Surfactant quantity is in turn a function of the reservoir's size and other characteristics.

The choice of the solubilizer employed is dependent on the choice of surfactants to be used. The minimum amount of a solubilizer that can control surfactant layering and precipitation is generally admixed with the surfactant solution to minimize the solubilizer cost. However, the cost of solubilizers may make even a minimal oil recovery operation unprofitable.

These disadvantages of the prior art are overcome by the present invention, however, and new and less expensive surfactant and solubilizer mixtures are provided for water flood operations.

SUMMARY OF THE INVENTION

A surfactant flooding solution for enhanced oil recovery is disclosed which comprises water, at least one surfactant, at least one solubilizer and a sulfonated dicyclopentadiene compound. This surfactant treating solution permits a substantial reduction in the quantities of relatively expensive solubilizer and surfactant needed to increase oil recovery without any loss of surfactant stability, activity or oil recovery efficiency.

Although the sulfonated dicyclopentadiene compounds are not themselves solubilizers or surfactants, they permit the combined use of some surfactants and solubilizers which could not be used together previously in water flooding operations. It is also a feature of the present invention to provide for surfactant and solubilizer mixtures which are non-precipitating in reservoirs with high divalent ion concentration.

A process for increasing hydrocarbon recovery is also disclosed wherein a 1% to about 20% aqueous treating solution comprised of at least one surfactant, at least one solubilizer and sulfonated dicyclopentadiene in water, is injected into an underground hydrocarbon formation. The treating solution reduces the interfacial surface tension between the hydrocarbons and water allowing the treating solution to displace the entrapped hydrocarbons from small rock pores.

BRIEF DESCRIPTION OF THE DRAWINGS

FIG. 1 is a ternary diagram illustrating the stability and displacement ability of a group of treating solutions containing a surfactant, a solubilizer, and sulfonated dicyclopentadiene.

FIG. 2 is a ternary diagram illustrating the stability and displacement ability of a second group of treating solutions containing a surfactant, a solubilizer and sulfonated dicyclopentadiene.

DETAILED DESCRIPTION

It is well known that conventional surfactant mixtures are usually composed of one or more petroleum sulfonates, a solubilizer, brine and, optionally, a quantity of hydrocarbon. These components are combined to make a surfactant composition (herein referred to as a "surfactant system"), for use in water flood operations.

The surfactant-brine mixture is conventionally injected into the reservoir to form a front followed by injection of additional brine or water which may contain a mobility control agent. The slug of a surfactant system is usually about ten to twenty percent of the pore volume of the reservoir. A typical prior art surfactant system may be:
1. One or more petroleum sulfonates, such as
   (a) a water soluble sulfonate having a relatively low equivalent weight (about 320), and
   (b) an oil soluble sulfonate having a relatively high equivalent weight (about 500), or
   (c) any other commercially available petroleum sulfonates;
2. A solubilizer such as alkylpolyalkoxyalkyl sulfate or sulfonate; or alkylarylpolyalkoxyalkyl sulfate or sulfonate;
3. Brine; and
4. Optionally, a light hydrocarbon.

The treating solution of the present invention is comprised of a surfactant such as petroleum sulfonate, constituting about 40% to about 85% by weight, preferably about 50% to about 80% by weight of the total solute weight in the treating solution; a solubilizer such as ethoxylated alkyl or alkylaryl sulfate or sulfonate, constituting about 10% to about 40% by weight, preferably about 15% to about 30% by weight of the total solute weight in the treating solution; and dicyclopentadiene sulfonate, constituting about 1% to about 35% by weight, preferably about 4% to about 25% by weight of the total solute weight in the aqueous composition.

Solute weight is defined here as the total weight of the active ingredients (surfactant, solubilizer and dicyclopentadiene sulfonate) present in the aqueous composition, excluding miscellaneous salts and ions dissolved in the brine of the treating solution. The total weight of the surfactants, solubilizers and sulfonated dicyclopentadiene ranges from about 1% to about 20% of the total weight of the treating solution, which includes the weight of the water or brine and the weight of the active ingredients.

Although a sodium salt of dicyclopentadiene sulfonate was selected for evaluation, other alkali metal salts, amide salts and ammonium salts of dicyclopentadiene sulfonate may be used in the treating solution of the present invention. This material is believed to be a mixture of two compounds having the following structures:

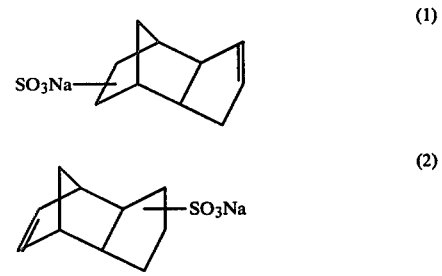

It is presently believed that the first isomer (1) is the predominate isomer.

The dicyclopentadiene sulfonate molecule differs from most sulfonates or sulfates used in enhanced oil recovery by molecular weight and structure. The equivalent weight of the sodium salt of dicyclopentadiene sulfonate is 236 grams per mole, while the equivalent weight of most prior art sulfonates is in the 350–700 grams per mole range. Second, surfactant molecules employed in oil recovery generally have an eight to sixteen carbon chain attached to an aromatic structure to serve as the oleophilic portion of the surfactant molecule. Sulfonated dicyclopentadiene has only a compact dicyclopentadiene group to serve as an oleophilic portion of the molecule. Because of these differences in molecular structure and equivalent weight, one would not expect the salts of dicyclopentadiene sulfonate to function efficiently in enhanced oil recovery surfactant systems.

The mixture of various components of a surfactant system often results in a viscous composition. The viscosity of the composition is primarily dependent upon the concentration and viscosity of each component, the concentration of dissolved solids in the brine and temperature. Increased viscosity of the brine is desirable for more efficient oil displacement, but viscosity that is too high can reduce the displacement rate of the surfactant system, prolonging the length of time required for the enhanced recovery operation. Also, displacement of a highly viscous surfactant slug through the reservoir with drive water may be difficult because the less viscous drive water will tend to bypass the viscous surfactant slug and thereby result in less efficient oil recovery.

To reduce the viscosity of the surfactant slug, a viscosity control agent may be mixed in at extra cost. It has been unexpectedly discovered that the addition of dicyclopentadiene sulfonates for the purpose of reducing expensive solubilizer and surfactant requirements will also significantly reduce the viscosity of the surfactant slug. The reduction in viscosity ranges from about 25% to about 75%.

Mobility or viscosity control agents may be added to increase the viscosity of a water slug that is injected following a surfactant slug to minimize any tendency of the driving slug to bypass the surfactant slug. Suitable mobility control agents for imparting the desired viscosity to the water or brine slug include, but are not limited to, polysaccharides and polyacrylamides. A mobility control slug usually ranges from ten to one hundred percent of the pore volume of the reservoir and is usually followed by drive water or brine.

In the present invention, a dicyclopentadiene sulfonate which does not in itself have useful oil recovery surfactant properties, is added to the surfactant system. Stable solutions are obtained with less solubilizer and less surfactant, in general, with no decrease in displacement efficiency. Because the solubilizers and surfactants are more expensive than the dicyclopentadiene sulfonate which partially replaces them, the total cost of the surfactant system is considerably reduced, rendering enhanced recovery of oil by a surfactant system more economically practical.

Another unexpected benefit from the addition of dicyclopentadiene sulfonate is the greater divalent ion tolerance exhibited by the surfactant system. This divalent ion tolerance permits the use of a brine with a higher calcium and magnesium concentration than previously possible and the use of the treating solution in formations with a high salt content brine. In some surfactant systems, the allowable calcium and magnesium concentration with the dicyclopentadiene compound may be substantially higher than the prior maximum salt concentration at which the surfactant system would have otherwise had precipitation or phase instability problems.

The following examples will further illustrate the enhanced oil recovery method of the present invention of injecting a surfactant treating solution containing sulfonated dicyclopentadiene. These examples are given by way of illustration and not as limitations on the scope of the invention. Thus, it should be understood that surfactants, solubilizers and amounts of compounds may be varied with the solutions still remaining within the scope of the invention.

Laboratory tests were performed to demonstrate the operability of the present invention in several embodiments. Multiple treating solutions were evaluated for several different surfactants, solubilizers, component concentrations, and brine salinities.

Ternary diagrams such as those illustrated in FIGS. 1 and 2 were prepared for the three main components for most of the treating solutions. Each apex of a ternary diagram represents 100% of the indicated component present in the solution. Each of the solutions in the series was evaluated as "precipitate," "stable" or "active." These evaluations were indicated on the ternary diagrams by an "X" if precipitate was observed, an "O" if the solution was stable or a triangle if the solution was both stable and active. If a solution is both stable and active, there is a strong indication that it would be effective in water flood operations, by increasing the displacement efficiency of the flood water.

All samples were prepared by adding brine and deionized water in varying amounts to make a total weight of 50 grams per sample. All solutions unless otherwise noted, were 5% solutions of surfactant, solubilizer, and sulfonated dicyclopentadiene in brine. Occasional samples were prepared with concentrations of 2.5 percent and 1 percent active ingredients.

Depending upon the hydrocarbon reservoir, it may be desirable to employ solution concentrations other than 5% active ingredients. In reservoirs where conformance is a problem, the use of less concentrated solutions might be desirable to prevent the excess loss of chemicals through channeling in areas already swept to a low residual oil saturation. Second, with concentrations lower than 5% active ingredients, the percentage reduction in solubilizer requirements is even greater. With solutions of lower concentrations such as 2.5%, the relative concentrations required to produce stable and active solutions may vary significantly from 5% solutions.

Surfactants employed were petroleum sulfonates sold under the trademarks of Petrostep 465, Petrostep 420 and Petrostep 399 by Stepen Chemical Co. The numbers in the trademarks are an approximation of the equivalent weights of each petroleum sulfonate. Petroleum sulfonates are generally produced by contacting certain oil refinery products with fuming sulfuric acid or gaseous sulfur trioxide. These oil refinery products may be produced from a selected boiling range fraction of petroleum feed stock, in accordance with the teaching of U.S. Pat. No. 3,302,713.

The solubilizers employed included two sulfated ethoxylated alcohols sold under the trademarks Alfonic 1412-A and 1412-S by Conoco Chemical Co. such as disclosed in U.S. Pat. No. 3,508,612. Sulfated ethoxylated solubilizers are stable where reservoir temperatures do not exceed about 50° C. In higher temperature reservoirs, ethoxylated sulfonates are preferred. Solubilizers tested included alkylpolyalkoxyalkyl sulfates and alkylbenzylpolyethoxy-ethane sulfates and propoxysulfonates. The dicyclopentadiene of choice was the sodium salt of the dicyclopentadiene sulfonate.

Due to wide variations in the total dissolved solids and divalent ion content of brines from different hydrocarbon formations, surfactant formulations must be tailored to the brine in the oil field of interest. Consequently, several different brine concentrations were tested including 22,000 grams per cubic meter total dissolved solids (TDS) brine with 2,500 grams per cubic meter of divalent ions, 80,000 grams per cubic meter TDS brine with 9,000 grams per cubic meter of divalent ions, 90,000 grams per cubic meter TDS brine with 10,000 grams per cubic meter divalent ions and 119,000 grams per cubic meter TDS brine with 13,300 grams per cubic meter divalent ions.

Solutions were made up to a total weight of 50 grams per sample, stirred with heating and aged for twenty-four hours in an oven at 43° C. Phase stability was then tested by visual observation. Absence of a precipitate or absence of two or more liquid phases in equilibrium resulted in a solution being labeled stable.

Capillary displacement was measured by filling a five microliter glass capillary tube with a mixture of 75% crude from a West Texas field having a 38° API gravity and 25% heptane by volume. The capillaries were then immersed in the treating solution. A solution was determined to be active if it displaced more than one millimeter of oil from the capillary tubes in twenty minutes.

Solution viscosity is another important factor to consider for injectivity and mobility control in surfactant flooding. Solution viscosity was measured at 43° C. using Cannon-Fenske viscometers. For optimum results solution viscosity should be within the 2-12 centipoise range.

Interfacial tension resulting from the surfactant treating solution were measured by the sessile drop method. Interfacial tension of less than about 100 millidynes per centimeter are necessary for efficient oil recovery.

Representative solutions were employed in surfactant floods using Berea Sandstone cores. The cores were cleaned and saturated with brine. The brine was then displaced with oil until an irreducible brine saturation was reached. The oil saturated cores were placed in a 43° C. air bath and water flooded with brine to residual oil saturation. The cores were then treated to a chemical flood consisting of a surfactant slug driven by a 1000 ppm biopolymer solution in fresh water. The polymer employed was a polysaccharide sold under the trade name Rhodopol 23-R by Rhone Poulenc Chemical Co. The chemical floods were conducted with a constant fluid injection rate of 0.1 cubic centimeters per minute for a 0.3 meters per day frontal advance rate. Polymer injection was terminated only after oil production ceased. There were no significant decreases in oil recovery efficiency discovered for any of the surfactant treating solutions containing sulfonated dicyclopentadiene and decreased quantities of solubilizer and surfactant.

EXAMPLE 1

The above experimental procedure was followed in investigating the stability and activity of multiple treating solutions prepared according to the present invention. Brine containing 22,000 grams per cubic meter TDS with 2,500 grams per cubic meter divalent ion content was employed as the aqueous phase. The petroleum sulfonate sold under the trade name Petrostep 465 by Stepen Chemical Co. was the surfactant and the ethoxylated sulfonate sold under the trade name Alfonic 1412-S by Conoco Chemical Co. was the solubilizer.

Without any dicyclopentadiene sulfonate in solution, the surfactant solutions were stable and active in the range of 72%-80% for Petrostep 465 and 20%-28% for Alfonic 1412-S. When 16% sodium salt of dicyclopentadiene sulfonate was added to the solutions, the surfactant solutions were stable and active in the lower range of 64%-72% for Petrostep 465 and 12%-20% for Alfonic 1412-S. Some stable and active solutions were found within the range of 1% to 25% dicyclopentadiene sulfonate, but not necessarily within the same surfactant to solubilizer ratios specified above.

Thus, it can be seen that as a proportion of dicyclopentadiene sulfonate increases in solution, less solubilizer and less surfactant were necessary to produce a stable and active solution.

Measurements of interfacial tension and viscosity were also made with these solutions in 22,000 grams per cubic meter TDS brine at 0%, 4% and 8% dicyclopentadiene sulfonate. An examination of Table I indicates that dicyclopentadiene sulfonate significantly lowered the viscosity of the treating solutions. Additionally, comparable interfacial tension measurements were obtained at 12% to 24% solubilizer with 16% dicyclopentadiene sulfonate added as were obtained at 20-28% solubilizer with 0% dicyclopentadiene sulfonate.

Decreases in expensive solubilizer and surfactant required to form stable and active surfactant treating solutions in the presence of dicyclopentadiene sulfonate significantly point out the cost advantages of the present invention. The savings for a large scale surfactant flood involving tens of millions of pounds of chemicals can be quite substantial when it is considered that conventional sulfonate solubilizers in the art can cost about four to six times the estimated manufacturing cost of dicyclopentadiene sulfonate, conventional sulfate solubilizers about twice the cost of dicyclopentadiene sulfonate and conventional petroleum sulfonate surfactants about twice the estimated manufacturing cost of the dicyclopentadiene.

EXAMPLE 2

Example 2 was conducted in the same manner as Example 1 except that the aqueous phase of the surfactant treating solution was comprised of 80,000 grams per cubic meter TDS brine with 9,000 grams per cubic meter divalent ions. Solutions were stable and active without dicyclopentadiene sulfonate in the range of 56%-64% Petrostep 465 and 36%-44% Alfonic 1412-S. When 16% dicyclopentadiene sulfonate was added, the solutions were stable and active in the lower range of 48%-60% Petrostep 465 and 20%-32% Alfonic 1412-S. Within similar limits, solutions were also found that were stable and active from 1% to 25% dicyclopentadiene sulfonate.

As can be seen by Table II, comparable interfacial tensions and substantially lower viscosities were achieved at roughly half the normal solubilizer requirements when 16% dicyclopentadiene sulfonate was added. The same or better properties were achieved with 20%-28% solubilizer as were obtained with 40%-44% solubilizer without sulfonated dicyclopentadiene.

EXAMPLE 3

The procedure of Examples 1 and 2 was followed in Example 3, except that the aqueous phase consisted of 119,000 grams per cubic meter TDS brine with 13,300 grams per cubic meter divalent ions. Without dicyclopentadiene sulfonate, stable and active solutions existed in the range of 64%-68% Petrostep 465 and 32%-36% Alfonic 1412-S. The addition of 16% dicyclopentadiene sulfonate lowered the surfactant and solubilizer requirements to 52%-60% Petrostep 465 and 24%-32% Alfonic 1412-S. Stable and active solutions were also discovered between 1% and 20% dicyclopentadiene sulfonate.

EXAMPLE 4

The aqueous phase was 89,335 rams per cubic meter TDS brine with 10,000 grams per cubic meter divalent ion content. The solubilizer was changed to a propane-sulfonated, six molar ethoxylated nonylphenol that we refer to as Adduct N-60 PS. Without dicyclopentadiene sulfonate, stable and active solutions existed in the range of 60%-72% Petrostep 465 and 28%-40% Adduct N-60 PS. After the addition of 16% dicyclopentadiene sulfonate, the ratios changed to 52%-60% Petrostep 465 and 24%-33% Adduct N-60 PS. Other stable and active solutions were also discovered between 1% and 20% dicyclopentadiene sulfonate.

EXAMPLE 5

The brine of Example 4 was employed, while the solubilizer was changed to an dodecylbenzyl, six molar ethoxy propanesulfonate that we refer to as Adduct D-60 PS. Without dicyclopentadiene sulfonate, stable and active solutions existed in the range of 52%–56% Petrostep 465 and 44%–48% Adduct D-60 PS. After 16% dicyclopentadiene sulfonate was added, the concentration ranges changed to 48%–60% Petrostep 465 and 24%–36% Adduct D-60 PS. Other stable and active solutions were also discovered within the range of 1% to 20% dicyclopentadiene sulfonate.

EXAMPLE 6

The procedure of Examples 4 and 5 was followed, while the solubilizer was changed to an nonylbenzyl, four molar ethoxy, propanesulfonate that we refer to as Adduct N-40 PS. Without dicyclopentadiene sulfonate, stable and active solutions were found in the range of 52%–64% Petrostep 465 and 36%–48% Adduct N-40 PS. After the addition of 16% dicyclopentadiene sulfonate, the concentrations changed to 48%–60% Petrostep 465 and 24%–36% Adduct N-40 PS. Other stable and active solutions were also found in the range of 1% to 20% dicyclopentadiene sulfonate.

EXAMPLE 7

These solutions were prepared in the same manner as Examples 4–6 with the substitution of a nonylbenzyl five molar ethoxy, ethanesulfonate. Reference to FIG. 1 shows large areas of stable and unstable solutions with small enclosed areas of stable and active solutions. It should be noted that stable and active solutions were not found to exist between this surfactant and solubilizer without the addition of sulfonated dicyclopentadiene. The addition of sulfonated dicyclo-pentadiene solfonate in quantities of 16%, 24%, 30% and 32% created stable and active solutions. This demonstrates the ability of dicyclopentadiene sulfonate to provide a solubilizer and surfactant mixture that would not be feasible for surfactant flooding without dicyclopentadiene sulfonate.

EXAMPLE 8

The same brine content as Examples 4–7 was employed with Petrostep 399 as the surfactant and Alfonic 1412-A as the solubilizer in Example 8. As shown in FIG. 2, without dicyclopentadiene sulfonate, a stable and active solution existed only at 28% solubilizer. But with the addition of 8% dicyclopentadiene sulfonate stable and active solutions were found with as little as 12% solubilizer. Thus, with the addition of a small amount of dicyclopentadiene sulfonate, a stable and active solution occured at a substantially lower concentration of solubilizer than possible without the dicyclopentadiene. As a result, the use of dicyclopentadiene sulfonate as a component in surfactant flooding system produces a significantly more economical surfactant solution.

Many other variations and modifications may be made in the concept described above by those skilled in the art without departing from the concept of the present invention. Accordingly, it should be clearly understood that the concepts disclosed in the description and drawings are illustrative only and are not intended as limitations on the scope of the invention.

TABLE I

SURFACTANT TREATING SOLUTION OF EXAMPLE 1 IN 22,000 g/m$^3$ BRINE

| Solubilizer kg/m$^3$ | 0 kg/m$^3$ DCPD-SO$_3$* | | 4 kg/m$^3$ DCPD-SO$_3$ | | 8 kg/m$^3$ DCPD-SO$_3$ | |
|---|---|---|---|---|---|---|
| | IFT** | Viscosity (cP) | IFT | Viscosity (cP) | IFT | Viscosity (cP) |
| 20 | 182 | 2.6 | — | — | — | — |
| 18 | 166 | 5.9 | 161 | 4.5 | 272 | 2.5 |
| 16 | 105 | 7.6 | 139 | 5.8 | 189 | 3.8 |
| 14 | 7 | 8.2 | 104 | 6.8 | 130 | 4.3 |
| 12 | 4 | 8.9 | 4 | 7.7 | 94 | 6.4 |
| 10 | <1 | 10.2 | 2 | 7.8 | <1 | 5.9 |
| 8 | OW*** | 22.3 | 8 | 15.9 | 4 | 8.1 |
| 6 | 35 | 12.6 | OW | 11.9 | 12 | 14.1 |

*Dicyclopentadiene sulfonate
**Interfacial tension in millidynes/cm
***Oil wet - no measurement possible

TABLE II

SURFACTANT TREATING SOLUTION OF EXAMPLE 2 IN 80,000 g/m$^3$ BRINE

| Solubilizer kg/m$^3$ | 0 kg/m$^3$ DCPD-SO$_3$* | | 4 kg/m$^3$ DCPD-SO$_3$ | | 8 kg/m$^3$ DCPD-SO$_3$ | |
|---|---|---|---|---|---|---|
| | IFT** | Viscosity (cP) | IFT | Viscosity (cP) | IFT | Viscosity (cP) |
| 24 | 64 | 10.3 | — | — | — | — |
| 22 | 1.0 | 11.2 | — | — | — | — |
| 20 | 5.0 | 11.7 | 17 | 6.9 | 125 | 3.3 |
| 18 | OW*** | 20.9 | 4 | 10.6 | OW | 6.2 |
| 16 | 46 | 7.3 | 13 | 14.0 | OW | 6.0 |
| 14 | ppt | — | OW | 6.2 | 7 | 6.9 |
| 12 | ppt | — | OW | 8.7 | 6 | 8.4 |
| 10 | ppt | — | ppt | — | 9 | 8.6 |
| 8 | ppt | — | ppt | — | OW | 7.8 |

*Dicyclopentadiene sulfonate
**Interfacial tension in millidynes/cm
***Oil wet - no measurement possible.

We claim:

1. An aqueous treating solution for injection into an underground hydrocarbon formation to increase hydrocarbon recovery, comprising:
   about 80% to about 99% by weight of water disposable in the formation;
   about 40% to about 85% of total solute by weight of petroleum sulfonate surfactant disposed in the water;
   about 10% to about 40% of total solute by weight of a solubilizer compound disposed in the water, said solubilizer selected from the group consisting of alkylpolyalkoxyalkyl sulfate alkylpolyalkoxyalkyl sulfonate, alkylarylpolyalkoxyalkyl sulfate and alkyarylpolyalkoxyalkyl sulfonate; and
   about 1% to about 35% of total solute by weight of dicyclopentadiene sulfonate disposed in the water.

2. The treating solution of claim 1, wherein the solubilizer is a mixture of said solubilizer compounds.

3. The treating solution of claim 1, wherein the dicyclopentadiene sulfonate is an alkali metal salt, amide salt or ammonium salt.

4. The treating solution of claim 1, wherein the water is connate water produced from the formation.

5. An aqueous treating solution for injection into an underground hydrocarbon formation to increase hydrocarbon recovery comprising:
   at least one petroleum sulfonate surfactant disposed in the water in an amount functionally related to formation characteristics;
   at least one solubilizer disposed in the water in an amount functionally related to the stability and dispersement of the surfactant in the water, said solubilizer selected from the group consisting of alkylpolyalkoxyalkyl sulfate, alkylpolyalkoxyalkyl sulfonate, alkylarylpolyalkoxyalkyl sulfate and alkylarylpolyalkoxyalkyl sulfonate;

a dicyclopentadiene sulfonate disposed in the water in an amount functionally related to the amount of solubilizer and surfactant in the water;

said amount of surfactant constituting about 50% to about 80% by weight, said amount of solubilizer constituting about 15% to about 30% by weight, and said amount of dicyclopentadiene sulfonate constituting about 4% to about 25% by weight of the total surfactant, solubilizer and dicyclopentadiene sulfonate present in solution; and said total of surfactant, solubilizer and dicyclopentadiene sulfonate constituting about 2% to about 6% by weight of the total solution.

6. A process for recovering hydrocarbons from an underground hydrocarbon formation; comprising:

injecting a treating solution into the formation to reduce the interfacial surface tension between the hydrocarbons and water, and displace the hydrocarbons;

said treating solution comprising an aqueous 1% to about 20% solution comprised of at least one petroleum sulfonate surfactant, at least one solubilizer selected from the group consisting of alkylpolyalkoxyalkyl sulfate, alkylpolyalkoxyalkyl sulfonate, alkylarylpolyalkoxyalkyl sulfate and alkylarylpolyalkoxyalkyl sulfonate and dicyclopentadiene sulfonate in water;

said surfactant constituting about 40% to about 85% by weight, said solubilizer constituting about 10% to about 40% by weight, and said dicyclopentadiene sulfonate constituting about 1% to about 35% by weight of the total surfactant, solubilizer and dicyclopentadiene sulfonate present in solution; and recovering the hydrocarbons.

7. The process of claim 6, wherein the treating solution is further comprised of a viscosity control agent for modifying the viscosity of the treating solution.

8. The process of claim 6, wherein at least one additional aqueous solution is injected into the reservoir after the injection of the treating solution to drive the treating solution through the hydrocarbon formation.

* * * * *